US00RE34354E

United States Patent [19]

Sondergeld

[11] E Patent Number: Re. 34,354

[45] Reissued Date of Patent: Aug. 24, 1993

[54] CHAIR FOR AN OFFICE OR THE LIKE

[76] Inventor: Horst Sondergeld, Wenzinger Strasse 32-34, D-7800 Freiburg, Fed. Rep. of Germany

[21] Appl. No.: 821,017

[22] Filed: Jan. 15, 1992

Related U.S. Patent Documents

Reissue of:

[64] Patent No.: 5,005,905
Issued: Apr. 9, 1991
Appl. No.: 297,678
Filed: Jan. 13, 1989

[30] Foreign Application Priority Data

Jan. 13, 1988 [DE] Fed. Rep. of Germany ..... 3800754
Dec. 28, 1988 [DE] Fed. Rep. of Germany ..... 3844102

[51] Int. Cl.[5] ..... A47C 1/032

[52] U.S. Cl. ..... 297/320; 297/281; 297/322

[58] Field of Search ..... 297/273, 280, 381, 316, 297/317, 320–322

[56] References Cited

U.S. PATENT DOCUMENTS

| | | | |
|---|---|---|---|
| 257,873 | 5/1882 | Klein . | |
| 303,551 | 8/1884 | Arnold . | |
| 465,275 | 12/1891 | Kennedy et al. . | |
| 561,908 | 6/1896 | Munson . | |
| 648,740 | 5/1900 | Haggard et al. . | |
| 898,305 | 9/1908 | Barnhart . | |
| 2,470,364 | 5/1949 | Niederhauser . | |
| 2,567,222 | 9/1951 | Lorenz . | |
| 3,596,906 | 8/1971 | Parmer | 297/316 X |
| 3,934,932 | 1/1976 | Ekornes | 297/320 |
| 4,533,177 | 8/1985 | Latone . | |
| 4,685,730 | 8/1987 | Linguanotto | 297/320 X |
| 4,687,250 | 8/1987 | Esche | 297/320 |
| 4,732,424 | 3/1988 | Uredat-Neuhoff | 297/320 X |
| 4,861,106 | 8/1989 | Sondergeld | 297/316 |

FOREIGN PATENT DOCUMENTS

| | | |
|---|---|---|
| 3415555 | 2/1985 | Fed. Rep. of Germany . |
| 3443374 | 5/1986 | Fed. Rep. of Germany . |
| 3632131 | 3/1988 | Fed. Rep. of Germany . |

*Primary Examiner*—Peter R. Brown

[57] ABSTRACT

A chair for an office or the like, having one seat and one back rest which are adjustable especially by body displacement, and having a support (24). The seat has a front seat section (28) and a rear seat section (30) which is connected pivotingly about a first, free-floating seat section about a second pivot axis (32) parallel to the first pivot axis but spaced apart therefrom. The front seat section is on the one hand displaceable by means of at least one supporting element (26) and at least one positive guide (25) along a path established by the positive guide, and on the other hand is suspended on the support for pivoting about a third pivot axis parallel to the first pivot axis but spaced away therefrom. The back rest is on the one hand displaceable by means of at least one additional supporting element (27) and the at least one positive guide (25) along a path established by the positive guide, and on the other hand is suspended on the support for pivoting about a fourth pivot axis running parallel to the first pivot axis and spaced away from the first, second and third pivot axis. The rear seat section is configured as a seat pan and disposed to float freely.

14 Claims, 11 Drawing Sheets

CHAIR FOR AN OFFICE OR THE LIKE

Figure 1:
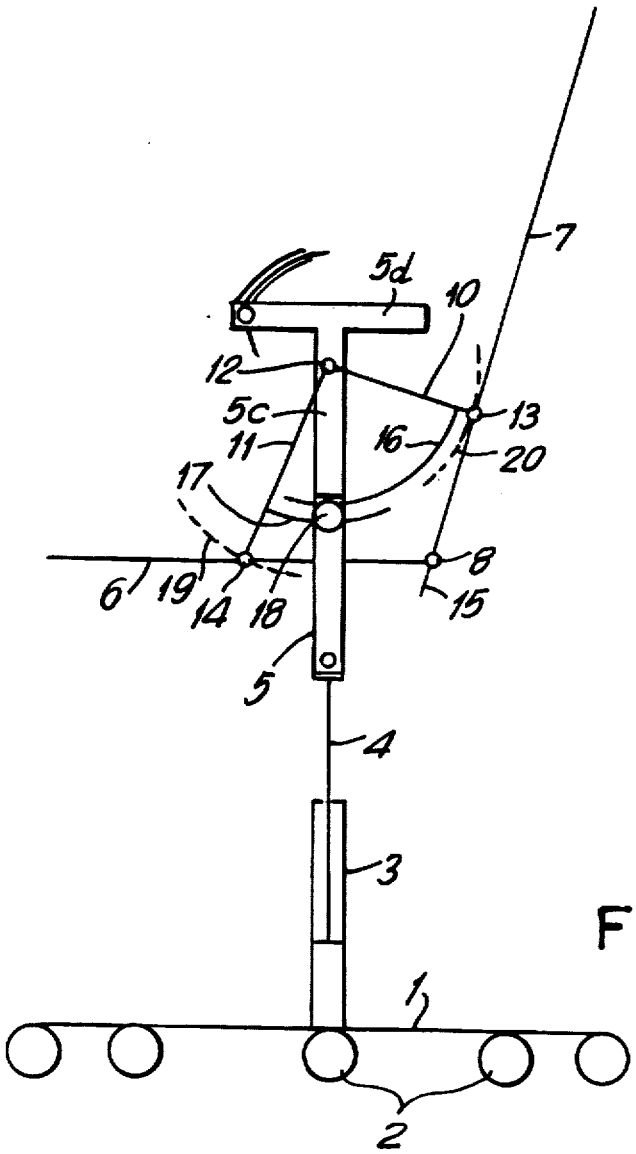

Matter enclosed in heavy brackets [ ] appears in the original patent but forms no part of this reissue specification; matter printed in italics indicates the additions made by reissue.

"The invention relates to a seat unit for an office chair or the like with seat and back adjustable, especially by body weight displacement."

Chairs with adjustable seats and/or back rests, especially those adjustable by shifting the body weight, are already known in a number of embodiments (DE-AS 12 85 701 and 20 26 929, DE-PS 85 44 21, 29 31 071 and 33 13 677, WO 83/03957 and 85/04084, U.S. Pat. No. 4,504,090), and are used chiefly in offices, motor vehicles or the like. In those cases, positive controls are provided for the seats and back rests which allow no more than a fixedly established pattern of movement.

Therefore, chairs have already been proposed (German patent application P 38 00 754) in which the angle of inclination of the seats and back rests can be freely selected within a wide range both absolutely and relative to one another, by body weight displacement, and in which the chair can be rocked as a whole back and forth in a virtually continuous manner between two end positions with the seat in a preselected position relative to the back rest. Furthermore, a great number of intermediate positions from an extreme upright position all the way to a reclining position can be established, thus affording the user great freedom of movement and choice. Since in this case the seats and back rests consist of largely rigid elements except for the common upholstery, a chair of the genus specified above has been proposed (German patent application P 38 00 756) whose seats have a front and a rear section, the front section of the seat being articulated to the rear section of the seat and, on the other hand, articulated by a linkage to the back rest of the chair. Thus, in the transition from the sitting to the reclining position the two seat sections are pivoted such that the angle between their bottoms is gradually reduced, thereby preventing an increasingly great upthrust of the thighs. In this chair, in order to promote a gradual flexing of the back in the area of the lower lumber vertebrae, which is desirable from the ergonomic point of view, when the transition is made gradually from the sitting position to the reclining position, its back rest is likewise of bipartite construction and coupled to the seat by an additional linkage. In this manner the articulated seat and back rest sections confronting one another can form a seating shell which is substantially preserved in all attainable sitting and reclining positions of the chair, while the second sections serve substantially only for the support of the thighs and back. The angle between the bottoms of the two seat sections depends exclusively on the opening angle between the rear seat section and the chair back, which does not result in optimum body posture in all possible sitting positions, and at least one linkage mechanism must additionally be provided, which for reasons of construction is undesirable.

It is therefore the purpose of the invention to configure the chair of the kind described above such that the angle between the two seat sections and between these and the chair back rest will be freely selectable, the chair profile at any time will be determined largely by the will of the user, while nevertheless all sitting and reclining positions will be brought about by mere body weight displacement, and, finally, desirable ergonomic conditions will be achieved. "According to this invention the seat unit comprises a support, at least one first positive guiding means coupled to said support and establishing a first path, at least one second positive guiding means coupled to said support and establishing a second path, a front seat section, at least one first supporting element for mounting said front seat section to said first positive guiding means such that said front seat section is displaceable along said first path and rotatable about a first axis, a back rest, at least one second supporting element for mounting said back rest to said second positive guiding means such that said back rest is displaceable along said second path and rotatable about a second axis, a rear seat section, at least one first hinge for pivotally couplying said rear seat section and said front seat section such that both sections can be pivoted relative to each other about a third axis, and at least one second hinge for pivotally coupling said rear seat section and said back rest such that both the rear seat section and the back rest can be pivoted relative to each other around a fourth axis. Said axis preferably are parallel to and spaced from each other.

Figure 2:
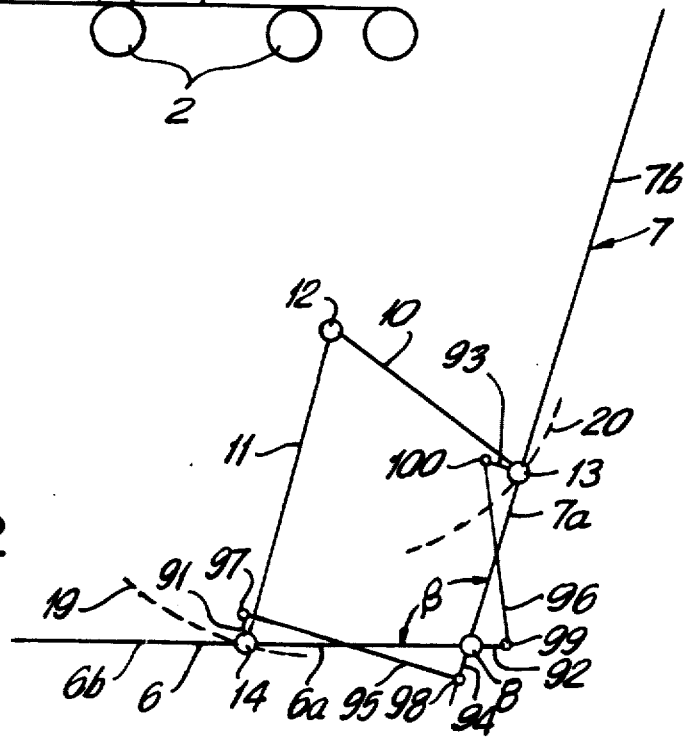
Figure 3:
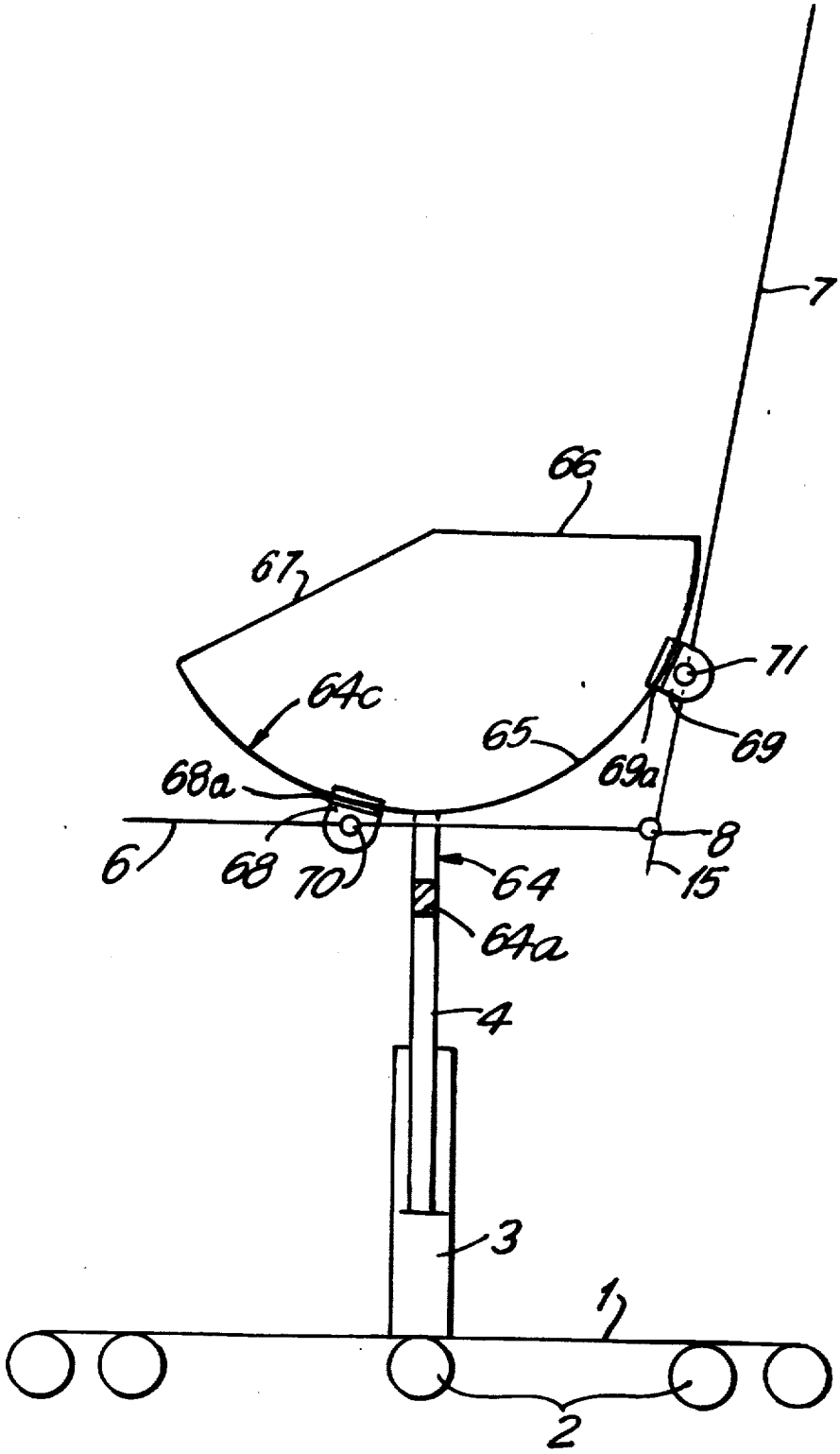
Figure 9:
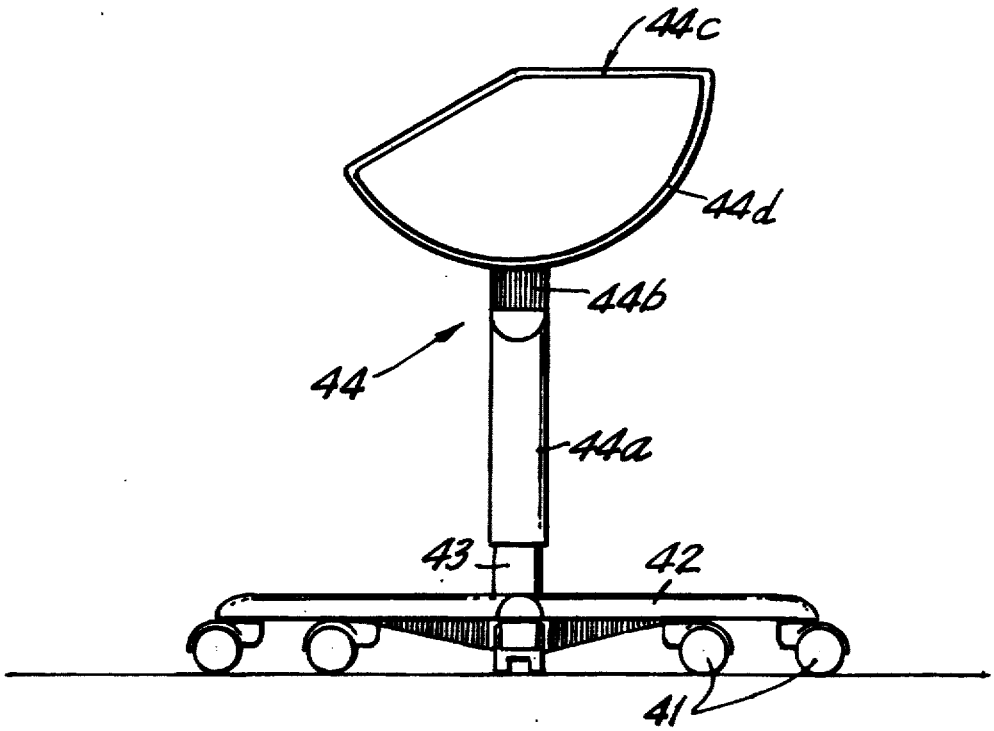
Figure 10:
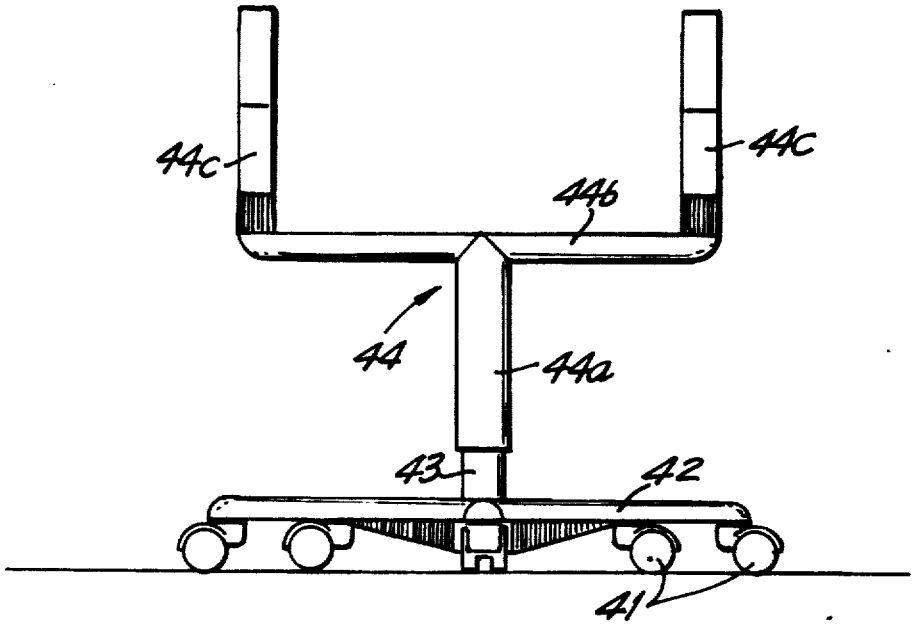
Figure 11:
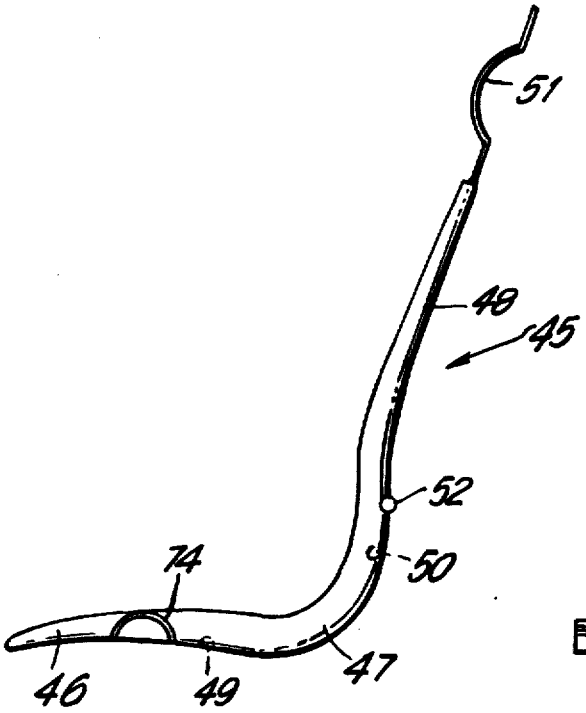
Figure 12:
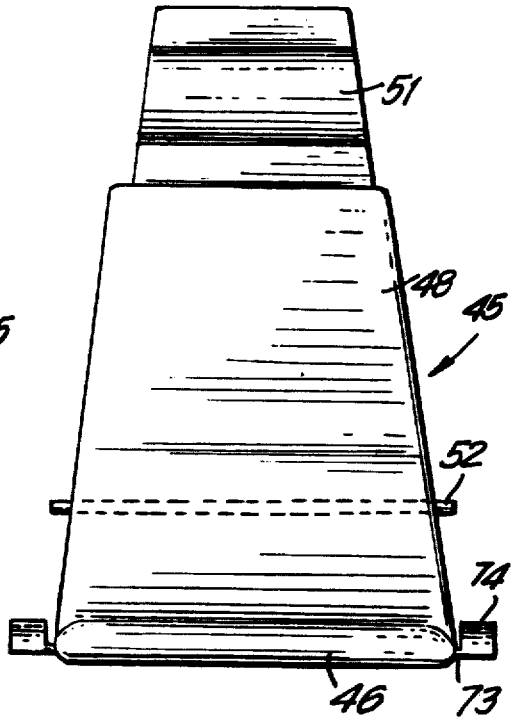
Figure 13:
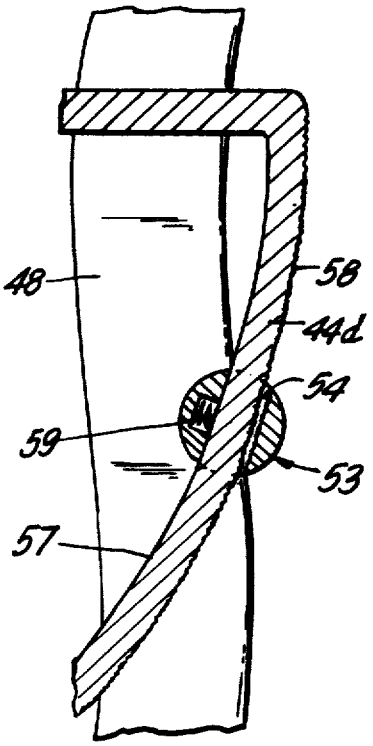
Figure 14:
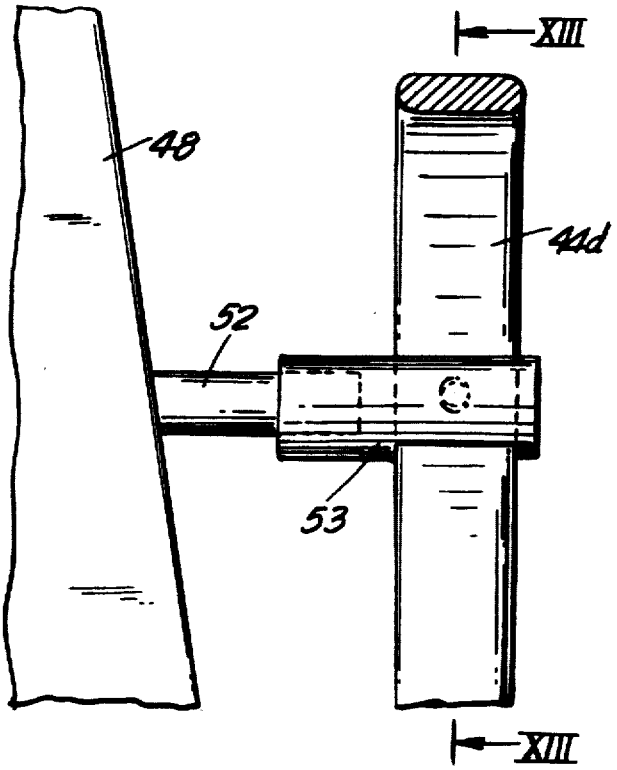
Figure 15:
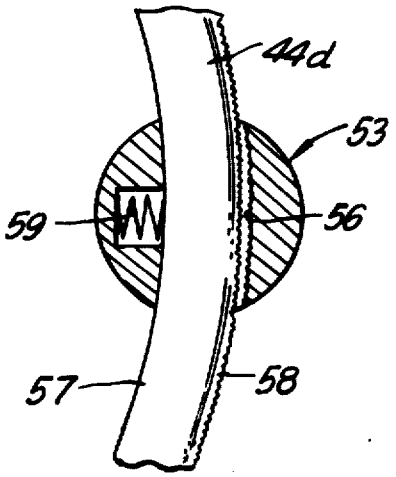
Figure 16:
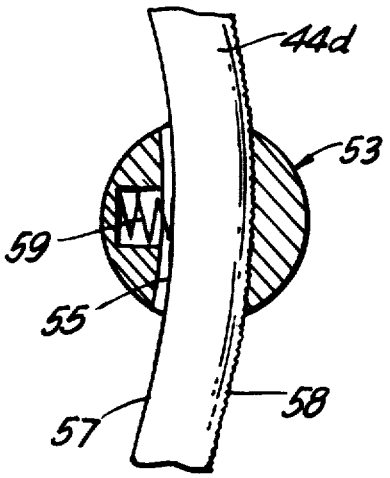
Figure 17:
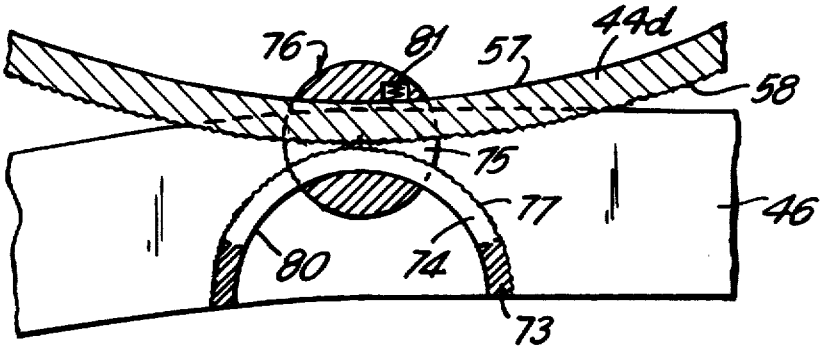
Figure 18:
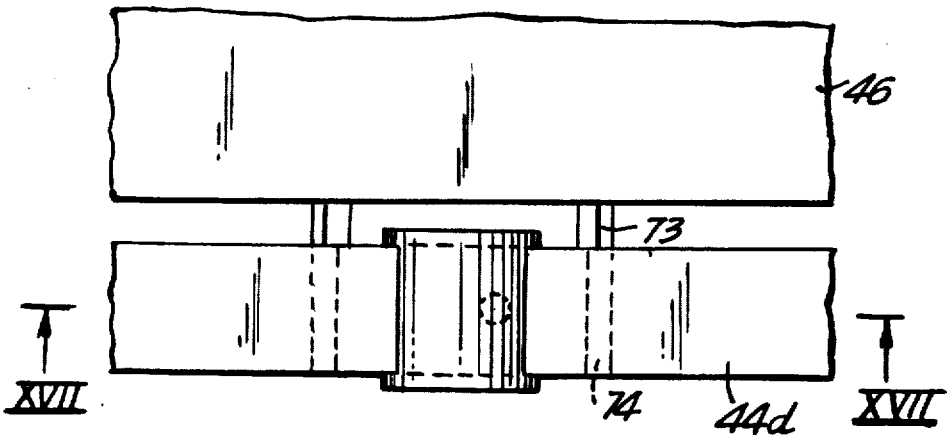
Figure 19:
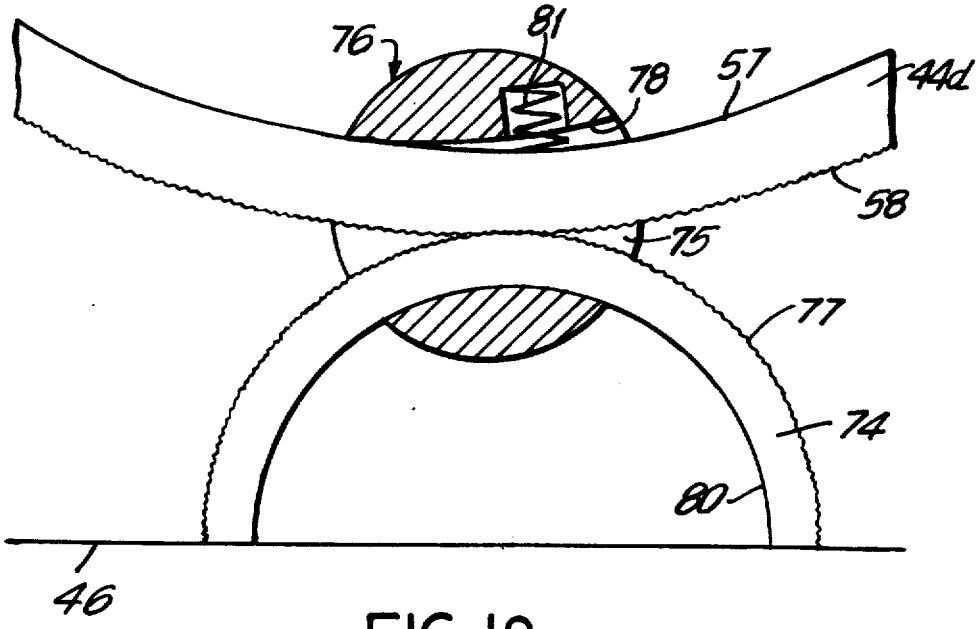
Figure 21:
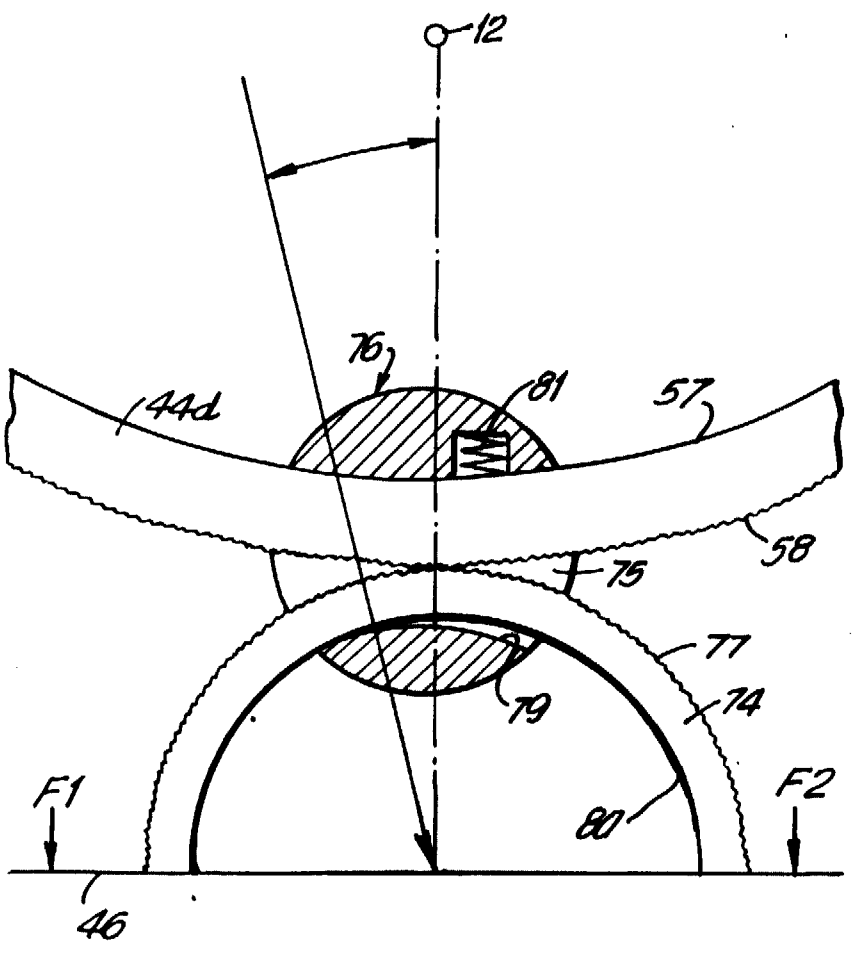
Figure 20:
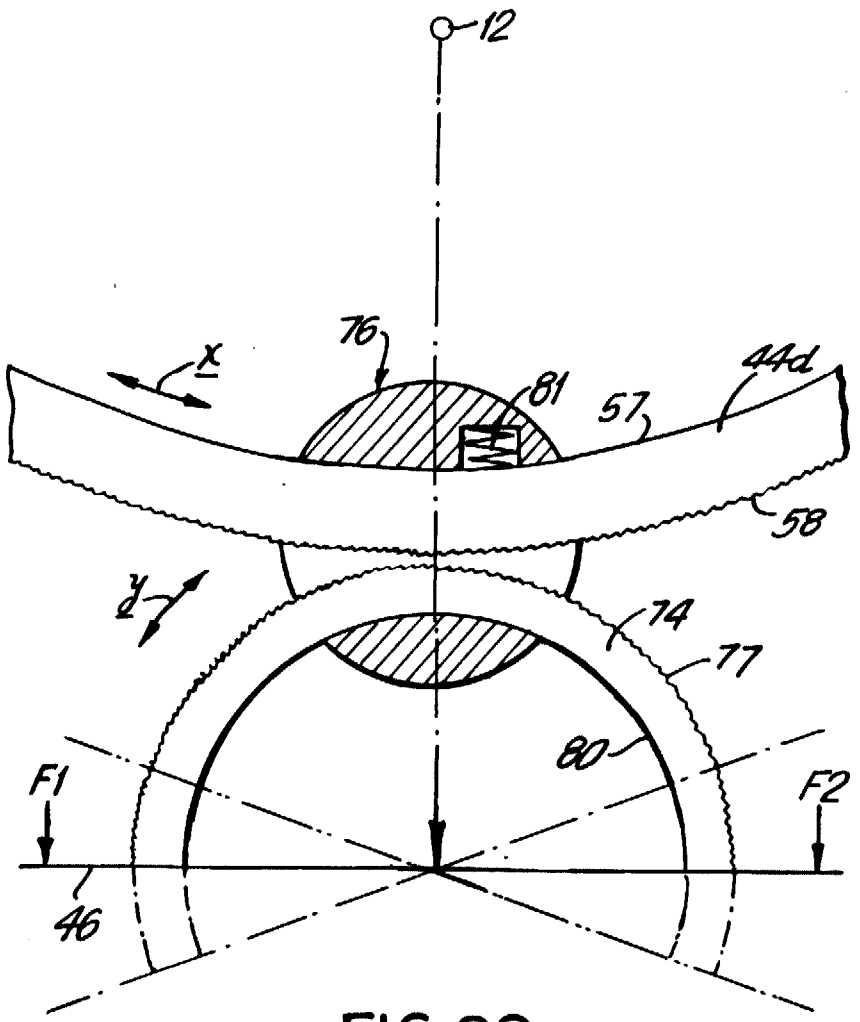
Figure 22:
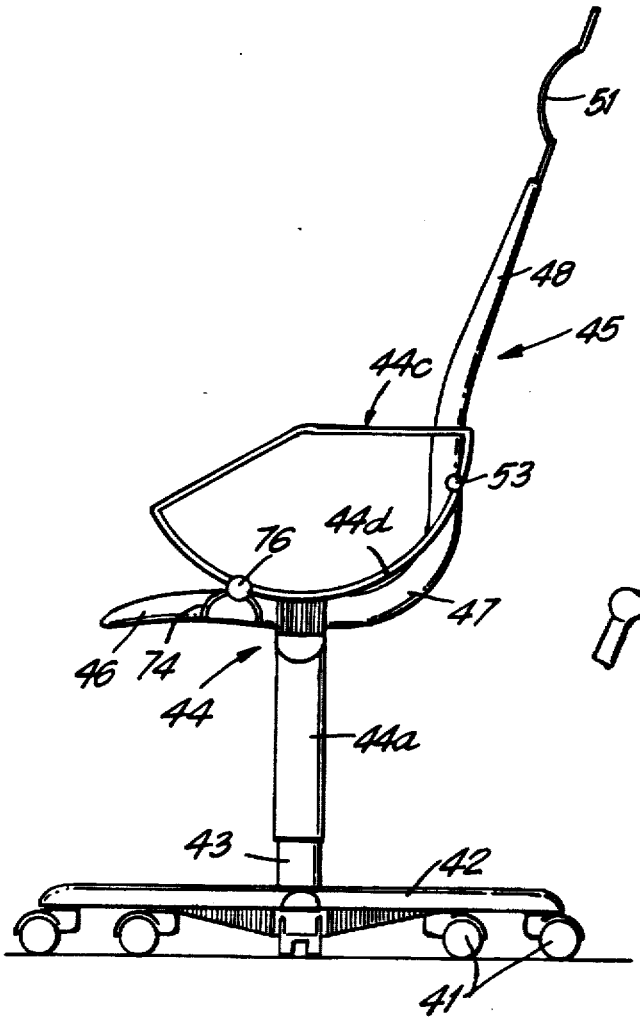
Figure 24:
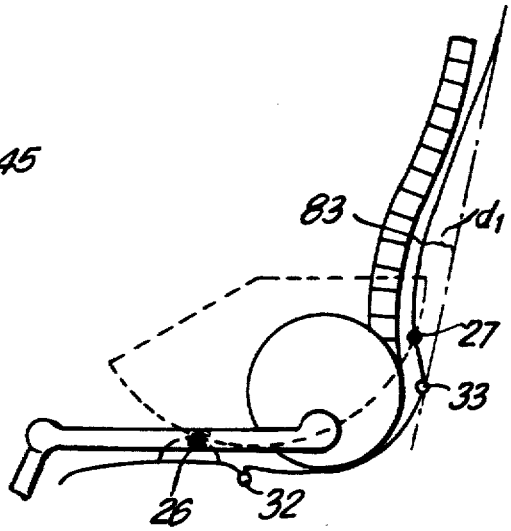
Figure 25:
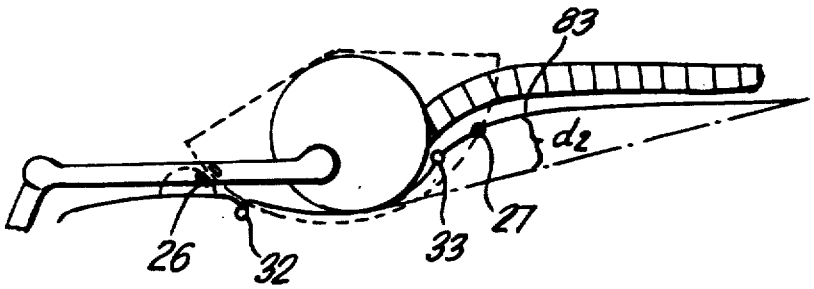
Figure 23:
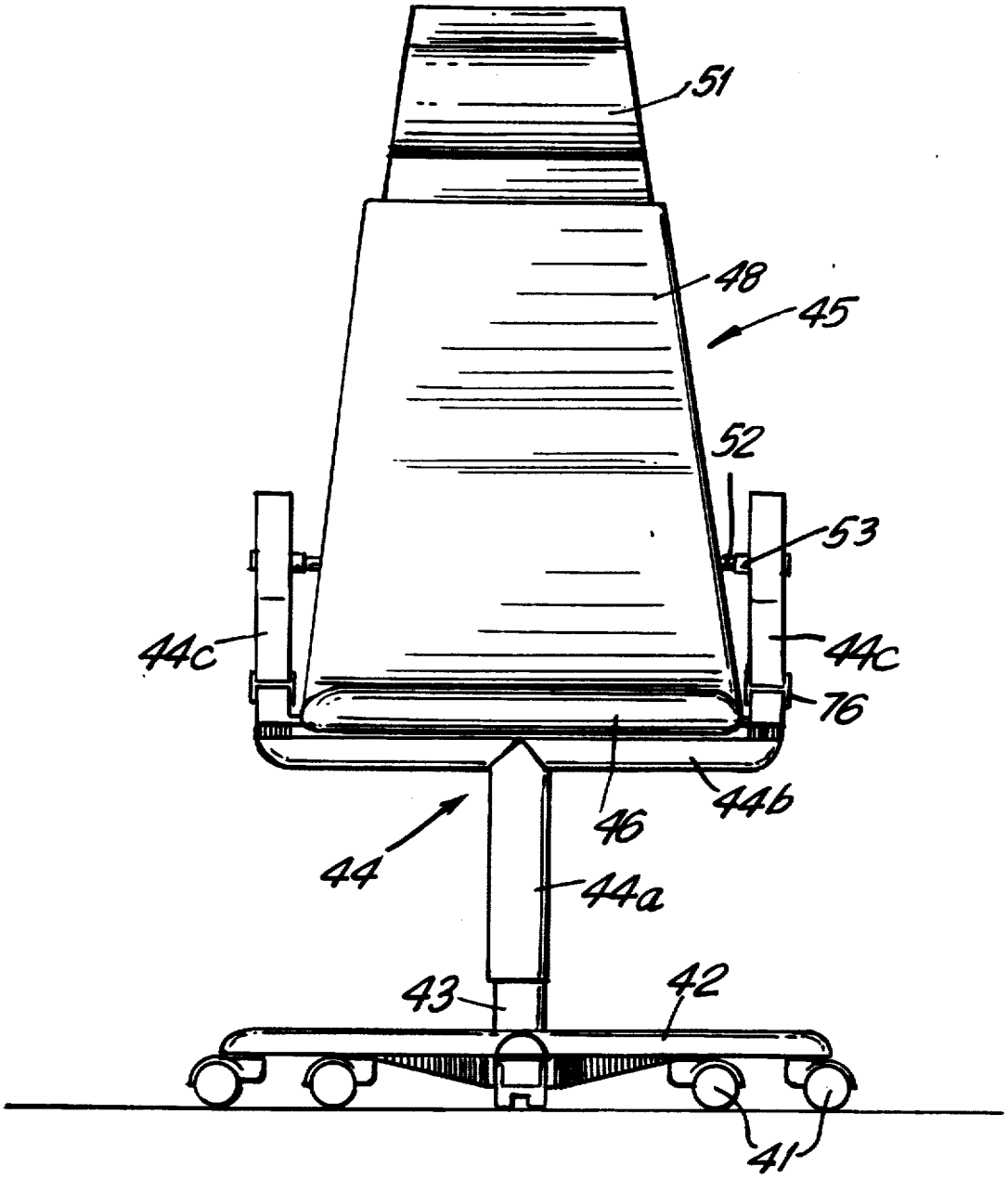

The invention and its advantages will be further explained below with the aid of embodiments in conjunction with the appended drawing, wherein:

FIGS. 1 to 3, three embodiments already proposed by the same applicant (cf. German patent applications P 38 00 754 and P 38 00 756, U.S. patent application Ser. No. 209,544) are shown in greatly simplified, schematic side views, FIGS. 4 to 8 show schematic views corresponding to FIGS. 1 to 3 of a first embodiment of the chair in accordance with the invention in different sitting positions, FIGS. 9 and 10 are side and front views of the chassis of an office stool with a second embodiment of the chair in accordance with the invention with seat and back rest parts removed, FIGS. 11 and 12 are side and front views of the seat and back rest parts of the chair in accordance with FIGS. 9 and 10, FIGS. 13 and 14 show a supporting element for the back rest of the chair of FIGS. 9 and 12 in a section along line XIII—XIII of FIG. 14 and in a front view, respectively, FIGS. 15 and 16 show an enlarged detail of FIGS. 13 and 14 in different working positions, FIGS. 17 and 18 show a supporting element for the front section of the seat of the chair of FIGS. 9 to 12 in a section along line XVII—XVII of FIG. 18 and in a top view, respectively;

FIGS. 19 to 21 show enlarged details of the supporting element of FIGS. 17 and 18 in different working positions, FIGS. 22 and 23 are side and front views of the office chair in the assembled state, and FIGS. 24 and 25 are rough schematic representations of a number of advantages achievable by the chair in accordance with the invention.

In FIG. 1, which shows the basic construction of the chairs herein concerned, the standard of an office seat is a frame 1 having, for example, five legs in a star-like arrangement with wheels or casters 2 rotatably fastened at their extremities. From the center of the frame 1 a tube 3 reaches vertically upward, in which a shaft 4 of a U-shaped support 5 is mounted for rotation and, if desired, height adjustment. The support 5 has a cross member disposed preferably perpendicular to the axis 4, and two limbs fastened to its ends and disposed preferably parallel to the shaft 4, which form supporting arms to whose free ends diagrammatically indicated arm rests 5d can be affixed. The cross member, supporting arms and arm rests 5d are preferably affixed to one another or made from one piece.

On the support 5 is suspended a seat which consists of a seat part 6 and a back rest part 7 which are pivotingly joined together at their rear and bottom ends, respectively, and preferably at both sides, about a first free-floating pivot axis defined by at least one joint 8. The joint 8 has, for example, a shaft passing through the back rest part 7 with both ends extending into the seat part 6.

The seat part 6 and back rest part 7 have supporting elements at points spaced away from the pivot axis of the joint 8, which are suspended by positive guides on the support 5 such that, on the one hand, they can be driven along the paths established by the positive guides, and on the other hand can be pivoted about parallel axes. The positive guides consist in FIG. 1 of two links 10 and 11. Link 10 is articulated at one end to the support 5 and at the other end by a supporting element in the form of an additional joint 13 to the back rest 7, the axis of joint 13 being situated above the axis of rotation of the joint 8. The link 11 is connected at one end by the second joint 12 or an additional joint having preferably the same pivot axis to the support 5, and at the other end it is articulated by a supporting element in the form of a fourth joint 14 to the seat part 6, the pivot axis of joint 14 being disposed between the pivot axis of joint 8 and the free front end of the seat part 6. Preferably identical joints 12, 13 and 14 and links 10 and 11 are provided on each side of the seat. At the same time the second joints 12 are fixed, i.e., undisplaceable on one associated supporting arm of the support 5, so that quadrilateral linkages are formed on both sides of the seat, consisting each of the joints 8, 12, 13 and 14, joint 12 being a center fixed in space about which the moving parts of the chair mechanism are able to move in many different ways. Since the quadrilateral linkages can be disposed in mirror image symmetry on both sides of the seat, only the linkage represented in FIG. 1 and its operation will be described hereinbelow.

To prevent the chair back rest 7 from collapsing in the extreme reclining position, the chair back rest 7 has an abutment 15 which cooperates with the seat part 6 and allows a maximum angle of 180 degrees between it and the chair back rest. For the achievement of a high stability for the entire chair, the joint 12 is preferably so disposed that its axis intersects a prolongation of axis 4 or is disposed at a slight distance from it, while joint 14 is on the front side and joint 13 on the rear side of axis 4.

The adjustments of the seat part 6 and of the chair back rest 7 which are possible by means of the quadrilateral linkages arise out of the fact that the axes of joints 13 and 14 can be moved each by itself or also both in combination along cylindrical surfaces 19 and 20 indicated in broken lines, the axes of the cylindrical surfaces preferably coinciding with the pivot axis of the second joint 12, and can be turned about axes (joints 8, 13, 14) running parallel to joint axis 12. The links 10 and 11 constitute positive guides which establish the paths of the curvilinear movements of joints 13 and 14, while joint 8 is free-floating, and for this reason also the angle of inclination of one of parts 6 and 7 with respect to the floor surface or the horizontal can be kept constant and only the angle of inclination of the other part 6 or 7 can be varied. By locking the joints 13 and 14 the chair back rest 7 and seat part 6 can also be fixed in space.

To provide the links 10 and 11 also with lateral guidance and be able in a simple manner to lock up the different sitting positions, the links 10 and 11 are additionally guided on the support 5. In the embodiment in FIG. 1, the links 10 and 11 are affixed to locking arms 16 and 17, respectively, which are represented only diagrammatically in FIG. 1. The locking arm 16 is joined to joint 10, extends in the direction of link 11, and is of a circular configuration. The locking arm 17 is joined to link 11, extends toward link 10, and is of an arcuate configuration. In both cases the center of the arc is preferably on the axis of the second joint 12. If the distance between the locking arms 16, 17, is relatively small as in FIG. 1, both can be locked with a common clamping means 18 fastened to the support 5, e.g., a clamping screw or the like, or released to change the chair position.

The embodiment seen in FIG. 2, from which the invention sets out, contains, as in FIG. 1, the chair seat 6 and back rest 7 joined together by at least one free-floating joint 8, the links 10 and 11 which are joined to the support, which is not shown, by at least one second joint 12, and the joints 13 and 14 acting as supporting elements. Since the rest of the parts are identical to the embodiment in FIG. 1, they have been omitted from FIG. 2 for the sake of simplicity.

The embodiment in FIG. 2 differs from the one in FIG. 1 in that the chair seat 6 consists of two sections 6a and 6b articulated to one another by the joint 14, and the chair back rest 7 consists of two back rest sections 7a, 7b articulated to one another by the joint 13. The joint 14 is preferably disposed approximately at the top of the thigh and joint 13 approximately in the area of the lower lumbar vertebrae of a person of average size, so that the front seat section 6b supports most of the thigh and the upper part 7b of the chair back rest supports most of the back, and parts 6a and 7a form only a kind of seat pan. At the same time the front section 6b of the seat has at its end adjacent the rear seat section 6a a fixedly fastened lever arm 91, and the rear section 6a of the seat has a fixedly fastened lever arm 92 prolonged beyond the joint 8, while accordingly the upper back rest section 7b is provided at its end adjacent the bottom section 7a of the back rest with at least one rigidly attached lever 94 extending beyond joint 8. The free ends of the lever arms 91 to 94 are configured as pivot eyes. Lastly, levers 95 and 96 are provided which have additional pivot eyes at their extremities. At the same time, by means of pivot pins, through shafts or the like, not represented, the pivot eyes of the lever arms 91 to 94 are joined by associated pivot eyes of levers 95 and 96 to associated pivot eyes of levers 95 and 96 to form additional joints 97 to 100 such that the arrangement shown in FIG. 2 will result.

Thus the seat section 6b is additionally articulated to the 94 of the back section 7a and back section 7b is articulated to the lever of seat section 6a. The result is, on the one hand, that, when joint 13 or joint 14 is locked, not only can the other link, 14 or 13, respectively, be moved along the cylindrical surfaces 19 and 20, respectively, but at the same time a relative rotation of the seat sections 6a, 6b, or back sections 7a, 7b, can be performed with respect to one another about the axes of rotation of joints 13 and 14 by means of the levers 95, 96. Furthermore, both joints 13 and 14 can be moved relative to one another or, if the opening angle beta is unchanged, they can be moved in the same sense along the cylindrical surfaces 19 and 20. In the embodiment shown in FIG. 3, a preferably U-shaped support 64 made preferably in one piece, which consists of a cross member 64a and two preferably frame-like side parts 64c disposed perpendicular thereto, is fastened on the shaft 4 as in the other embodiments. The side members 64c are semicircular and have a lower, preferably arcuately shaped frame member 65 which consists, for example, of a member of rectangular, square, circular or tubular cross section and extends, for example, over a third of a circle. The one end of the frame member 65 is joined to the one end of a bar 66, which is substantially perpendicular to the axis 4 and at the same time can be configured as an arm rest, while the other end of the frame member 65 is connected by a bar 67 to the other end of bar 66. The upper part of the side members 64c formed of the bars 66 and 67 can alternatively be free-form or can even be omitted.

The chair configured according to FIGS. 1 or 2 has on both sides and at points distanced from the joints 8 supporting elements 68, 69, which consist, for example, of guides disposed on both sides of the chair seat 6 and on both sides of the chair back rest. These supporting elements 68 and 69 are fastened fixedly to the ends of the shafts 70 and 71, respectively, which are rotatably mounted in the seat 6 or back rest 7, or on shafts fixedly mounted in the seat 6 and back rest 7, and each has a passage 68a and 69a through which one of the frame parts 65 passes.

The frame parts 65 are configured as cams along which the supporting elements 68, 69 of the seat 6 and/or chair back rest 7 can be shifted as desired. The frame parts 65 thus constitute each a positive guide for the supporting elements 68, 69, which in turn permit the seat 6 and back rest 7 to pivot about the axes 70 and 71. Additionally, locking means not shown, and limiting means not shown could be provided, which would limit the possible length of movement of the supporting elements 68, 69, on the frame parts 65 and could consist of pins mounted on the supporting elements 68, 69, and engaging in grooves in the frame parts 65. The frame parts 65 define paths of movement which can lie on the same cylinder surfaces as the paths given by the links 10 and 11 (FIG. 1), the axis of these cylinder surfaces advantageously intersecting perpendicularly a prolongation of axis 4 or being at only a slight distance therefrom, in order to achieve great stability for the entire office chair.

The chair diagrammatically represented in FIGS. 4 to 8 and configured in accordance with the invention corresponds to the embodiments in FIGS. 1 to 3 to the extent that it has a seat and a back rest which by means of at least one positive guide and at least one supporting element can be shifted along a path established by the positive guide, on the one hand, and on the other hand is suspended on a support 24 so as to be able to pivot about axes running perpendicular thereto.

The support 24 is preferably configured and disposed like support 64 in FIG. 3, and especially is provided with parts 24a, 24b, 24c and 25 which correspond to parts 64c, 65, 66 and 67 in FIG. 3. The supporting elements 26 and 27 are accordingly displaceably mounted on the circular frame part 25, and on them a front seat section 28 and a back rest part 29 are respectively mounted. A rear seat section 30 of a seat designated as a whole by the number 31 is configured as a seat pan and is concavely shaped on the upper side which is occupied by the user. Furthermore, the seat section 30 is pivoted at its front end by means of at least one joint 32 to the front seat section 28, and at its rear end it is pivoted by at least one joint 33 to the back rest 29. The joint 33 defines a first, free-floating pivot axis corresponding to the pivot axis of joint 8 in FIGS. 1 to 3, about which the seat and back rest can pivot. The joint 32 defines a second, likewise free-floating pivot axis parallel to the first pivot axis, but at a distance therefrom. Lastly, the supporting elements 26 and 27 and their joints define with the seat and back rest 31 and 29, respectively, a third and fourth pivot axis; these axes are likewise parallel to but at a distance from the first pivot axis and are displaceable along the positive guides. In comparison to the embodiment in FIG. 2, the second and the third pivot axis (supporting element 26) furthermore do not coincide. Instead, these axes are spaced apart and are arranged such that the second pivot axis serves for the pivoting of the two seat sections 28 and 30 on one another and the third pivot axis serves for the pivoting of the two seat sections 28 and 30 on one another, relative to the supporting element 26.

Figure 4:
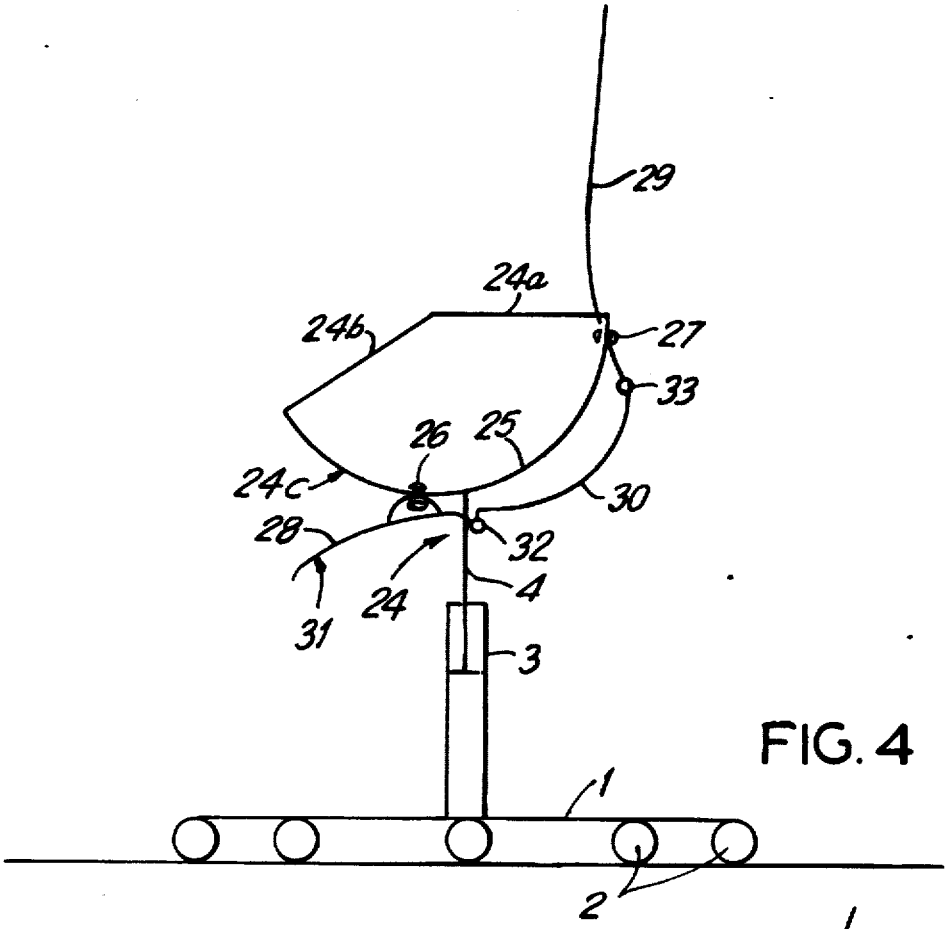
Figure 5:
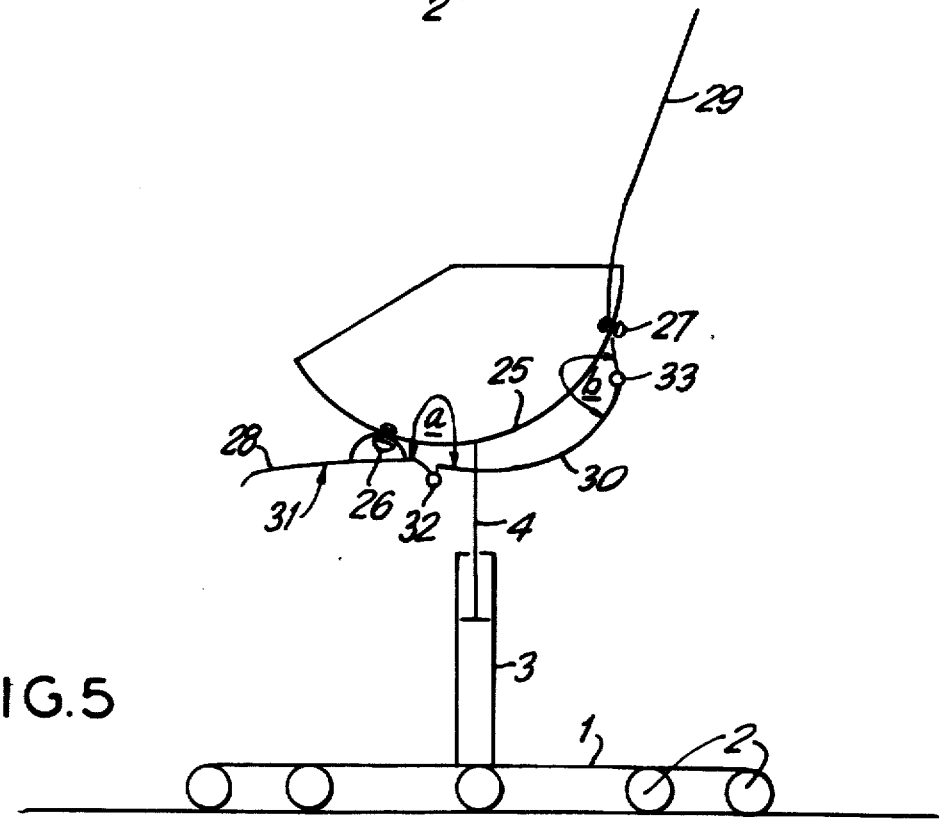
Figure 6:
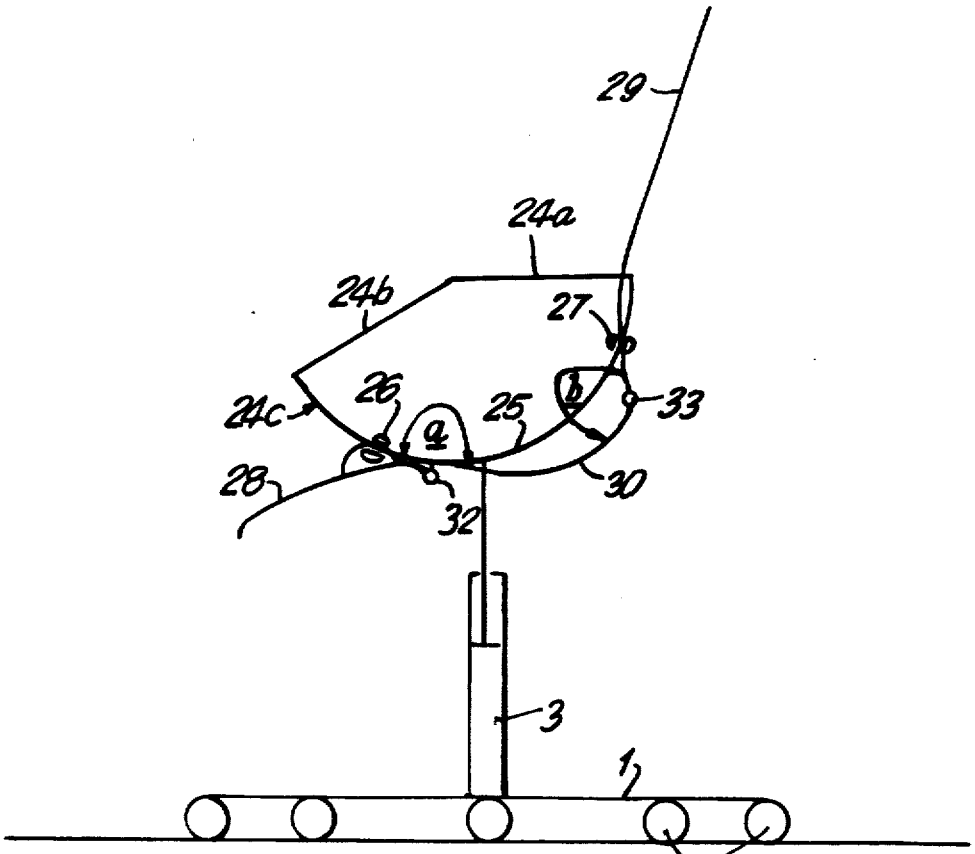
Figure 7:
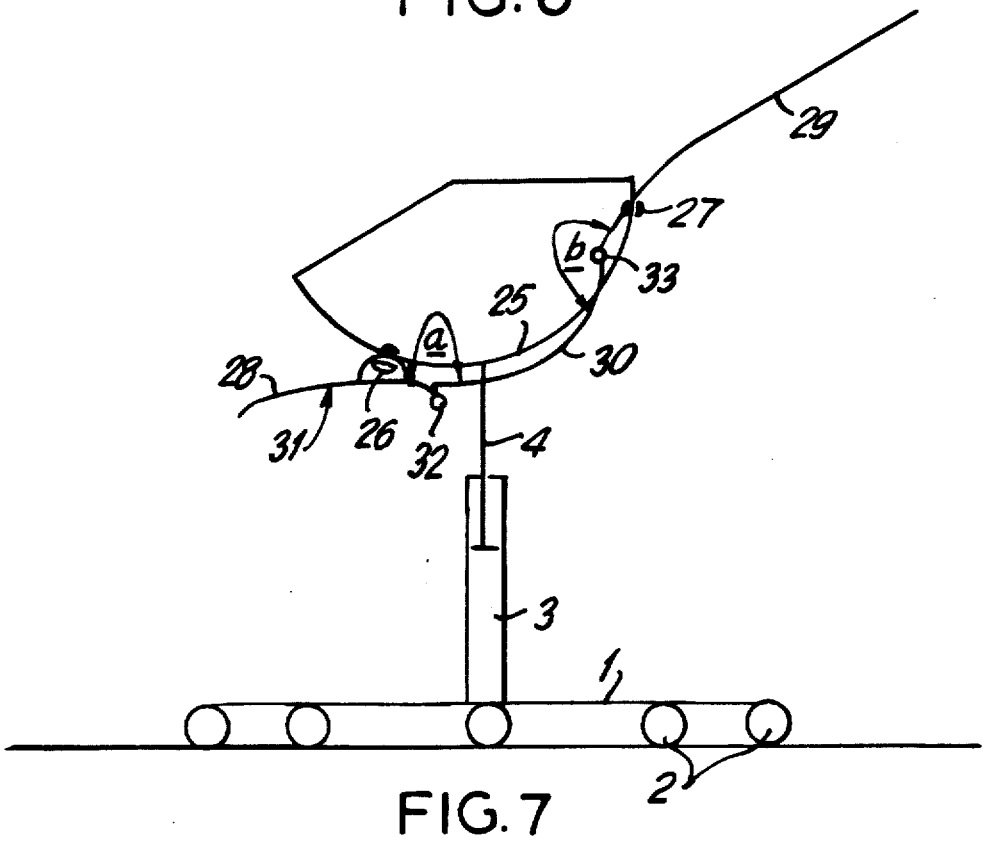
Figure 8:
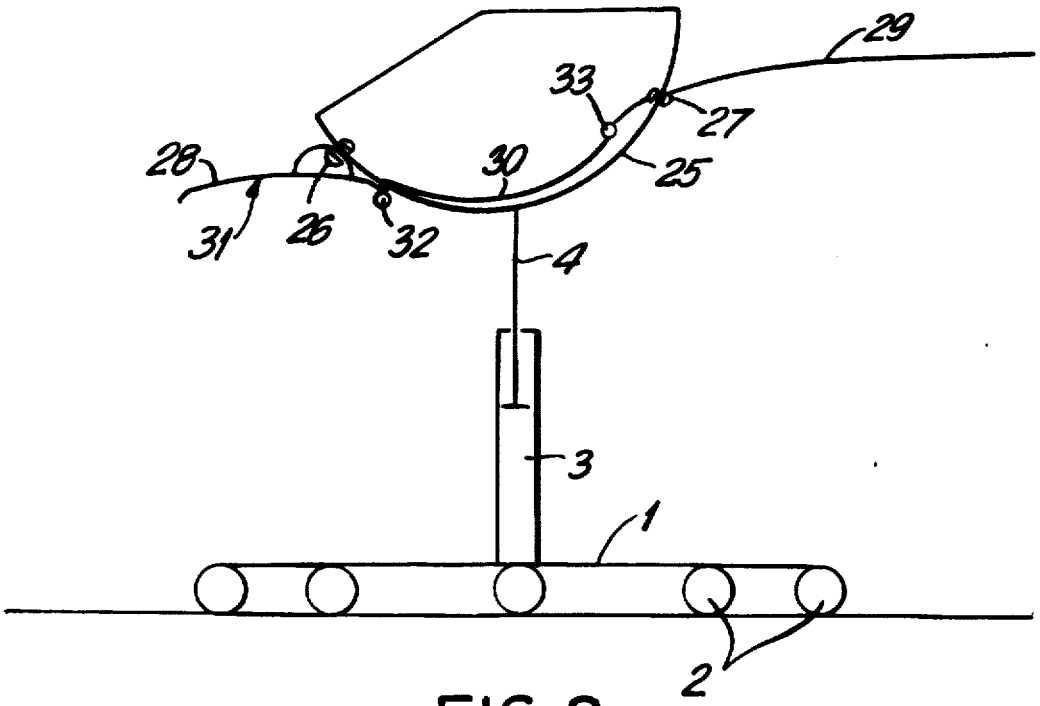

A number of the sitting positions possible with the chair in accordance with the invention are shown in FIGS. 4 to 8. FIG. 4 shows a sitting position in which the back rest 29 is virtually vertical and the front seat section 28 tilts slightly downward. In the sitting position according to FIG. 5, the seat as a whole has been shifted along the frame part 25, in comparison to FIG. 4, such that the angles a and b represented in FIG. 5 between the two seat sections 28 and 30 and between the rear seat section 30 and the back rest 29 have remained constant. In the sitting position in FIG. 6, the back rest 29 assumes the same absolute angle with respect to the vertical. By shifting the supporting element 26 along the frame part 25, however, the front end of the rear seat section 30 has been slightly lifted and the front end of the front seat section 28 has been slightly lowered, so that, in comparison to FIG. 5, the angle a has enlarged, but angle b has diminished. The sitting position of FIG. 6 is derived from the one in FIG. 5 by holding the front seat section 28 and pivoting the back rest 29, i.e., by reducing the angle a and increasing angle b while keeping the front seat section 28 in the same absolute position. Lastly, the reclining position in FIG. 8 is reached, setting out from the position in FIG. 4, for example, by shifting both supporting elements 26 and 27 along the frame part 25.

As seen in FIGS. 4 to 8, many different sitting positions can be brought about by selectively shifting only one of the supporting elements 26 and 27. Additional sitting positions can be established by shifting both of the supporting elements 26 and 27. Between any possible sitting positions a step-less transition is possible. All these positions can be reached by simple body weight displacements which control especially the profile of the chair surface.

The profile of the chair surface is therefore determined by the user, and, in contrast to the embodiment in FIG. 2, it is not dependent upon the absolute actual position of the back rest 29. If the back rest is held stationary, the chair surface profile can be varied within wide limits (cf. FIGS. 5 and 6, for example). The application of the chair sections to the user's body is performed automatically and without using hand levers. The chair in accordance with the invention therefore promotes dynamic sitting and satisfies the natural need of human beings for movement.

An especially important advantage of the chair in accordance with the invention is that, by adjusting the angles a and b, not only the angle between the user's thighs and pelvis on the one hand and the horizontal on the other, but also the thigh/pelvis and pelvis/spine angles, which are important to the human body, are freely adjustable, and thus also the degree of spinal curvature. Thus, ergonomically desirable conditions can be created in any of the desired sitting positions.

The chair in accordance with the invention will be further explained below with the aid of an embodiment which has been felt to be the best for practical use at this time. It is represented in FIGS. 9 to 23.

In FIGS. 9 and 10, a vertical shaft 43 is fastened on a frame 42 supported on casters or wheels 41, and on it is supported a vertical pipe 44a of a rotatable and vertically displaceable rack 44. On the vertical pipe 44a there is fastened perpendicular thereto a cross member 44b having two preferably frame-like side parts 44c disposed parallel to the vertical pipe axis. Parts 44, 44a, 44b and 44c form preferably a rigid assembly. The frame parts are configured substantially as shown in FIGS. 3 to 8 and are provided especially with arcuate frame parts 44d.

A chair unit 45 has, as seen in FIGS. 11 and 12, a front seat section 46, a rear seat section 47 and a back rest 48 corresponding to parts 29, 29 and 30 shown in FIGS. 4 to 8, which are made of plate-like or grille-like components, are ergonomically curved, provided, if necessary, with the desired surface shape by means of additionally applied upholstery, and joined pivotingly together by links 49 and 50 represented in broken lines, by the fact that one part can be provided with a through-going rod or with pins provided only on the sides, and the other part in each case can be provided with mountings having bores accommodating the rod ends or the pins. The back rest 48, which can be provided with an adjustable or fixed head rest 51, has on its sides, as seen in FIGS. 13 and 14, a pivot pin 52 which is journaled in a blind hole in a supporting element 53. This supporting element 53 is furthermore provided with a passage 54 running substantially perpendicular to the pivot pin 52 by which it is slipped onto the arcuate frame part 44d so that it is held for longitudinal displacement thereon. The passage 54 is defined on its side facing the front side of the office chair by a smooth, preferably correspondingly arcuate slide surface 55 (FIG. 16) but on its opposite side by a rough or toothed locking surface 56 (FIG. 15). In like manner, the frame part 44d can have a slide surface 57 cooperating with slide surface 55 and a likewise rough or toothed locking surface 58 cooperating with the locking surface 56.

Lastly, the one end of a compression spring 59 thrusts against the slide surface 57 of the frame part 44d and its other end thrusts against the bottom of a blind hole formed in the supporting element 53, so that, when the back rest 48 is not loaded, the two locking surfaces 56 and 58 can be held in engagement, thus largely preventing displacements of the supporting element 53 on the frame part 44d. If the user, however, leans against the frame part 44d. If the user, however, leans against the back rest 48, the slide surfaces 55 and 57 are brought into contact against the pressure of the compression spring 59, so that the supporting element 53 can be shifted along the frame part 44d in accordance with the load.

In FIGS. 17 to 21 a hanger 73 is affixed to each side of the front seat section 46; the hanger has a semicircular bridge 74 which is inserted into a passage 75 in a supporting element 76. In the same passage 75, and above the bridge 74, the frame part 44 is also inserted, which has on its upper side the slide 57 and on its lower side the locking surface 58 (cf. also FIGS. 13 to 16). The bridge 74 has on its upper side a rough or toothed locking surface 77 cooperating with the locking surface 58. Otherwise, the passage 75 is defined in its upper portion by a smooth guiding surface 78 cooperating with the guiding surface 57 of the frame part 44d (FIG. 19), and at its lower portion by a likewise smooth guiding surface 79, which cooperates with a smooth guiding surface 80 formed on the bottom of the bridge 74. The guiding surfaces 57, 78, on the one hand, and the guiding surfaces 79, 80, on the other, are best curved accordingly, for example with a radius of about 212 mm for the guiding surfaces 57, 58, and with a radius of about 35 mm for the guiding surfaces 79, 80. Lastly, the supporting element 76 has a preferably excentrically arranged blind hole against whose bottom the one end of a compression spring 81 thrusts and its other end is urged against the sliding surface 57, such that when the front seat section 46 is in the unloaded state the two locking surfaces 58 and 77 are pressed against one another and thereby prevent shifting the supporting element 76 along the frame part 44d (FIG. 19).

If the front seat section 46 is loaded in a substantially uniform manner, in that approximately equal forces F1 and F2 are exerted at both ends of the bridge 74 (FIG. 20), e.g., by means of the user's thighs, i.e., the user assumes the "correct" sitting posture in which all parts of the seat surface are loaded about equally, then the locking surfaces 58 and 77 are released from one another against the force of the compression spring 81 (FIG. 20). The user can then, by shifting his body weight, move the supporting element 76 along an arrow x and/or by rolling the surface 80 of the bridge 74 on the surface 79 of the supporting element in the direction of an arrow y. If after that the sitting position reached is to be locked up again, all that is needed is a one-sided loading, e.g., of the front edge of the front seat section 46 (FIG. 21). In FIG. 20, the resultant force runs through the theoretical center point or rotational center 12 and perpendicular to the floor on which the chair is standing, while in FIG. 21, the deviation therefrom is represented diagrammatically.

In comparison with the supporting element 53, therefore, the supporting element 76 also has a locking feature, which is activated or deactivated by body weight displacement, but it has no fixed pivot axis, since the pivot mechanism formed of the supporting element 76 and the bridge 74 allows different pivot axes to a certain extent. But as to the principle and the cinematic possibilities, conditions are the same as in the application of the arrangements shown in FIGS. 1 to 3.

When the entire office chair is in the assembled state, the appearance diagrammatically represented in FIGS. 22 and 23 is the result.

The locking described offers the following advantages: Each sitting position can be locked up by body weight displacement, by exerting an increased pressure with the thighs on the front edge of the front section 46 of the seat. To release the lock it is necessary only to reduce this pressure again. No manual manipulations are necessary to actuate the locking. If the chair is unoccupied, or if only the front part of the chair is sat upon, the locking is performed automatically. If the lock is released the center of gravity of the combined user and chair automatically comes above the axis 43, so that a high stability is achieved in all sitting positions. Moreover, the chair automatically adjusts to the body weight of any user, distributing the pressure equally to the various areas of the seat surface.

Unlike the embodiment described in connection with FIGS. 9 to 23, it is possible, of course, to configure the positive guides for the front seat part 46 and the back rest 48 also by the means shown in FIGS. 1 to 3, especially with rigid links 10 and 11 (FIGS. 1 and 2), the links 10 and 11 also being able to be parts of stable, disk-like elements which are suspended on the support for rotation on the joint 12. Alternatively, it would also be possible to provide the frame parts 65 and 44d in accordance with FIGS. 3 to 23 with arcuate grooves in which studs or the like provided on the supporting elements can slide. Especially, any forms of construction which are described in the applicant's earlier proposals (German Patent Application P 38 00 754 and P 38 0 756 as well as U.S. patent application Ser. No. 109,544) can be used in making the positive guides.

The tripartite construction of the chair in accordance with the invention, with two floating pivot axes, makes possible an ergonomically beneficial configuration of the seat and back rest. The rear section of the seat can be constituted of a rigid bottom part joined by the joints and a flexible upper part gripped between the front seat section and the chair back to form the actual seating surface, and the space between the bottom and top parts can be filled with a foam material or the like.

To satisfy the ergonomic requirements insofar as possible, the geometric dimensions are selected such that, for people of average size, their lower lumbar vertebrae will be located approximately at the pivot axis of joints 27 (FIGS. 5 to 8) or 50 (FIG. 11), and the pivot axes of the joints 32 (FIG. 4 to 8) or 49 (FIG. 11) will be located just in front of the pelvis when they are in the natural seated posture. These conditions will be brought about, for example, by using the dimensions given in FIG. 6, which are in millimeters, and by using the radii given above, of 212 mm for the guiding surfaces 57 and 78, and 35 mm for 79 and 80.

Furthermore, the seat and back rest is given the approximate shape seen in FIGS. 4 to 8 and 11 by means of applied padding, by bending the foundation material, or the like. This shape is characterized by a slightly convex curvature of the front section 28, 46, of the seat, a concave curvature of the rear section 30, 47, of the seat, which increases rearwardly, and a convexly curved segment provided on the back rest 29, 48, limited to the area of the lower lumbar vertebrae, and directly adjoining the joint 33 or 50, and forming alone, or in cooperation with the adjacent portion of the rear seat section 30, 47, the so-called lumbar support. Thus the freely selected angle b (FIG. 5) largely determines the degree of spine curvature or the angle between pelvis and spine, or the spinal posture, while the likewise freely selected angle a (FIG. 5) determines the pelvis/thigh angle which is also important to the spinal posture, since the position of the pelvis has a strong effect on the spinal posture.

Moreover, the chair in accordance with the invention permits an ergonomically beneficial posture when sitting upright, when typing, for example, which is indicated in FIG. 24. In this posture the pelvis is given a gentle, positive support (a so-called "accommodation wedge") by a slight lifting of the rear section 30 or 47 of the seat, and is thereby straightened up, and on the other hand the spinal column is brought by the virtually vertical chair back 29 or 48 to a desirable posture, curved rearwardly by the lumbar support. In the reclining position (FIG. 25) the pelvis, however, is lowered in a hollow formed by the rear section 30 and 47 of the seat. At the same time the arrangement can also be selected, in an ergonomically desirable manner, such that, when sitting, that point 83 (FIG. 24, 25) of the lumbar hollow which corresponds to its maximum elevation will be at a comparatively shorter distance h1 from the upper edge of the back rest 29 and the radius of curvature of the lumbar hollow will be comparatively greater, while on the other hand, in the reclining position, the point 83 of maximum elevation d2 of the lumbar hollow will be at a comparatively greater distance h2 from the upper edge of the back rest 29, 48, and the radius of curvature of the lumbar hollow will be comparatively smaller.

The shape that is used in any particular case for the seat and back rest areas in the area of the joints 32, 33, and 49, 50, can vary for the purpose of achieving optimum conditions in selected chair positions. The shape described and represented in the drawing, however, is selected so that the best possible conditions will be obtained in all chair positions.

The invention is not limited to the embodiments described, which can be modified in many ways. This is true, for example, of the support 5, which could be fastened also on a fixedly mounted frame, not one that can be moved on casters or wheels 2, but it is also true in regard to the forms described with the aid of the drawings for the supports, frame parts, positive guides, supporting elements, locking means and the like, which can be especially adapted to the formal requirements of each case. In particular it is possible to combine with one another in many ways the individual parts and assemblies described with the aid of the embodiments.

The seat and back rest of the chair described consist of platelike components of rectangular or square cross section, which are joined to one another by the joints 32, 33 and 53, 76, respectively. Alternatively, both parts can be made in the form of tubular frames or the like, which serve for mounting a continuous, flexible seat and back rest unit, whose surface is shaped according to the ergonomically desired conditions. Any padding or the like has been omitted from the drawing for simplification. Since the joints are free-floating, they can be replaced alternatively by strips or the like, of a flexible material.

The radii of the arcs along which the various supporting elements are positively guided can be of equal or different length. In the case of the embodiments this can be brought about, for example, by providing sides having two frame parts joined by a step, which both run along arcs of different radii, and serve, for example, for guiding the supporting elements 68 and 69 in FIG. 3. It would furthermore be possible to make the supporting elements for the back rest and the rear seat section of different lengths, so that the pivot axes of the one will be guided by design in the direct vicinity of the path of movement established by the positive guiding means, and the pivot axes of the other will be guided at a relatively great distance away from the path established by the positive guiding means. Similar conditions can also be created, for example, by providing cranked or offset pivots or the like. Lastly, embodiments in which the paths established by the positive guiding means for the supporting elements are not arcuate but of a different shape are also possible. Aside from that, it is possible to give these paths a different length or to select different lengths by appropriate limiting means, so that different ranges of adjustment of the supporting elements of the seat and/or back rest can be obtained.

The embodiments in accordance with FIGS. 9 to 23 are furthermore not limited to the locking described, by means of the locking surfaces 56, 58 and 77. Instead, they can also be replaced by braking surfaces with a sufficiently high frictional resistance which are pressed together when the springs 59, 81, are activated and then prevent further displacement of the seat or back rest.

In the case of the embodiments in FIGS. 1 and 2, it is not essential that the links 10 and 11 be journaled on the same axis represented by the joint 12. It would also be possible to mount the links 10 and 11 so as to pivot about different axes. In like manner, the centers of the paths of movement formed by the cams of the embodiments in FIGS. 3 to 23, if they are circular paths, could lie on the same axis or even on different axes. A close juxtaposition or coinciding of these two axes and the arrangement of both axes in the prolongation of axis 4 and 43, respectively, is preferred, however, because it brings the advantage that the user's bodily center of gravity remains substantially invariably on the axis 4 or 43 or its imaginary prolongation in all anticipated sitting and reclining positions, thereby achieving a high stability for the office chair represented. The same applies during the body weight displacements necessary for changing the sitting or reclining position. It is furthermore advantageous that the back rest is always in contact with the user's back, any position can be locked up, and the center of gravity of the body can automatically shift to the center column (shaft 4 and 43) of the office chair.

It is especially advantageous that the chair automatically adapts itself to the body weight of the user and no forces such as spring forces or the like operating against the body weight are present. Springs or the like would have the undesirable consequence that the user's body would always have to act against a diffuse spring force, and the spring force would have to be rendered adjustable at the cost of great complexity in order to be able to adapt it to the particular user'weight.

It is advantageous for the use of the chair according to the invention that the thrusting force of the back rest is produced by the user's body weight, since it depends on the distribution of the user's weight in the position assumed in each case. For this reason, therefore, no additional forces, especially springs or the like, are required in order to bias the back rest towards the user's back.

Despite the advantages listed above, the user is nevertheless held firmly and securely in any sitting or reclining position by the combination of seat and back rest, and no forces other than the natural force of gravity are involved. Due to the friction forces present the chair is furthermore stabilized such that even without locking up the seat or back rest the assumed sitting position can be lastingly retained.

The skeleton diagrammatically indicated in FIGS. 24 and 25 is represented in the natural posture which it assumes when no external forces are acting and the natural course of movement can be followed. It can be seen that the spinal column in FIG. 24 is less curved rearwardly than in FIG. 25. Therefore the upper sides of the rear seat section and/or of the back rest are to be so shaped, and the distances between the different pivot axes are so to be selected, that this natural posture can be achieved or individually set with the chair that has been described. The lumbar hollow can be produced simply by a corresponding hollow in the lower part of the back rest, but also by a combined effect of the rear seat section and back rest in the area of the joint 33. Care must also be taken to see that, in the transition from the position in FIG. 24 to the position in FIG. 25, no sharp or projecting edges and no undesirable corners will be formed. The same, applies to the area of joint 32.

What is claimed is:

1. Seat unit for an office chair or the like and being adjustable by especially body displacement, comprising: a support; at least one first positive guiding means coupled to said support and establishing a first path; at least one second positive guiding means coupled to said support and establishing a second path; a front seat section; at least one first supporting element for mounting said front seat section to said first positive guiding means such that said front seat section is displaceable along said first path and rotatable about a first axis; a back rest, at least one second supporting element for mounting said back rest to said second positive guiding means such that said back rest is displaceable along said second path and rotatable about a second axis; a rear set section; at least one first hinge for pivotally coupling said rear seat section and said front seat section such that both sections are pivotable relative to each other about a third axis; and at least one second hinge for pivotally coupling said rear seat section and said back rest such that both the rear seat section and the back rest are pivotable relative to each other around a fourth axis.

2. Seat unit according to claim 1, wherein said first and second positive guiding means are constructed such that said front seat section and said back rest are movable along said paths such that the angles between said front and rear seat section and between said rear seat section and aid back rest remain constant.

3. Seat unit according to claim 1 or 2, wherein said paths established by said first and said second positive guiding means run along circles.

4. Seat unit according to claim 1, wherein said support has a fifth axis and wherein said first path substantially lies to one side of said fifth axis whereas said second path substantially lies to the other side of said fifth axis.

5. Seat unit according to claim 1, wherein said first and second positive guiding means consist of at least a first and a second link which are pivotally mounted to said support by at least one joint, and wherein said first link is pivotally coupled to said front seat section, whereas said second link is pivotally coupled to said back rest.

6. Seat unit according to claim 1, wherein said first and second guiding means consist of at least one first cam and at least one second cam affixed to said support, wherein said first supporting element is positively guided on said first cam, and wherein said second supporting element is positively guided on said second cam.

7. Seat unit according to claim 6, wherein said cams are provided by an arcuate frame part.

8. Seat unit according to claim 6, wherein at least one of said cams and a respective supporting element are provided with cooperating locking surfaces for locking in a selected seating position.

9. Seat unit according to claim 8, wherein said at least one cam is an arcuate frame part, wherein said supporting element is provided with a passage and slipped with said passage onto said frame part for displacement thereon, wherein said passage is defined at one side by a first slide surface and on an opposite side by a first locking surface, wherein said frame part has on one side a second slide surface cooperating with said first slide surface and on an opposite side a second locking surface cooperating with said first locking surface, and wherein a spring is mounted in said frame part for urging said first locking surface against said second locking surface when said supporting element substantially is in an unloaded state, and for releasing said locking surfaces from each other when said supporting element is substantially in a loaded state.

10. Seat unit according to claim 8, wherein said at least one cam is an arcuate frame pat, wherein said supporting element is provided with a passage and slipped with said passage onto a semicircular bridge and on said frame part, wherein said passage is defined at opposite sides by a first and a second slide surface respectively, said first slide surface cooperating with a slide surface at one side of said frame part and said second slide surface cooperating with a slide surface at one side of said bridge, wherein said frame part and said bridge are provided with said cooperating locking surfaces at opposing sides thereof, and wherein a spring is mounted in said supporting element for releasing said locking surfaces from each other when the bridge is loaded in a substantially uniform manner and for urging said locking surfaces against each other when said bridge is substantially unloaded or non-uniformly loaded.

11. Seat unit according to claim 1, wherein the rear section of the seat is configured as a seat pan.

12. Seat unit according to claim 1, wherein said at least one first hinge is a free floating hinge.

13. Seat unit according to claim 1 or 12, wherein said at least one second hinge is a free floating hinge.

14. Seat according to claim 1, wherein said axes are parallel to and spaced from each other.

* * * * *